US012686968B2

(12) United States Patent
Wang et al.

(10) Patent No.: US 12,686,968 B2
(45) Date of Patent: Jul. 21, 2026

(54) IRONING MACHINE

(71) Applicant: SHEN ZHEN SPIRAL GALAXY TECHNOLOGY CO., LTD, Shenzhen (CN)

(72) Inventors: Xin Wang, Shenzhen (CN); Jieshun Liang, Shenzhen (CN); Haixiang Xie, Shenzhen (CN); Chengxing Xiao, Shenzhen (CN); Erxuan Yi, Shenzhen (CN)

(73) Assignee: SHEN ZHEN SPIRAL GALAXY TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/091,811

(22) Filed: Mar. 26, 2025

(65) Prior Publication Data

US 2025/0243622 A1 Jul. 31, 2025

(30) Foreign Application Priority Data

Feb. 14, 2025 (CN) ......................... 202510161835.3

(51) Int. Cl.

| | |
|---|---|
| ***D06F 75/24*** | (2006.01) |
| ***D06F 75/18*** | (2006.01) |
| ***D06F 75/20*** | (2006.01) |
| ***D06F 75/26*** | (2006.01) |
| ***H05B 3/78*** | (2006.01) |

(52) U.S. Cl.
CPC .............. *D06F 75/24* (2013.01); *D06F 75/18* (2013.01); *D06F 75/20* (2013.01); *D06F 75/26* (2013.01); *H05B 3/78* (2013.01)

(58) Field of Classification Search
CPC .......... D06F 75/08; D06F 75/10; D06F 75/12; D06F 75/14; D06F 75/16; D06F 75/20; D06F 75/24; D06F 75/30; D06F 75/18; D06F 75/26
See application file for complete search history.

(56) References Cited

U.S. PATENT DOCUMENTS

2014/0373402 A1* 12/2014 Zhang ..................... D06F 79/02 38/14
2021/0277591 A1* 9/2021 Lai .......................... F22B 1/285
2024/0271357 A1* 8/2024 Yu ........................... F22B 1/285

FOREIGN PATENT DOCUMENTS

CN 114753133 A * 7/2022 ............. D06F 75/24

* cited by examiner

*Primary Examiner* — Nathan E Durham
(74) *Attorney, Agent, or Firm* — Birchwood IP

(57) ABSTRACT

The disclosure relates to the technical field of ironing machines and discloses an ironing machine. The ironing machine includes an ironing part, where the ironing part includes a heating cabin body and a dust collecting box being isolated. A heating element assembly is arranged in the heating cabin body, and the heating element assembly includes a heating main body for generating steam, where the heating main body is provided with a main heat pipe and an auxiliary heat pipe connected in parallel, and the auxiliary heat pipe is connected in series with a fan. An air port of the fan is communicated with an inside of the dust collecting box, a surface of the dust collecting box is provided with a plurality of adsorption holes communicated with the inside of the dust collecting box.

8 Claims, 11 Drawing Sheets

IRONING MACHINE

CROSS-REFERENCE TO RELATED APPLICATIONS

This application claims priority of Chinese Patent Application No. 202510161835.3, filed on Feb. 14, 2025, the content of which is hereby incorporated by reference.

TECHNICAL FIELD

The disclosure relates to the technical field of ironing machines, in particular to an ironing machine.

BACKGROUND

Most ironing machines/hanging ironing machines on the market only have steam generation function, and the research and development direction of ironing machines/hanging ironing machines' manufacturers is basically around how to improve the heating efficiency or product safety. Therefore, the ironing machines/hanging ironing machines on the market now need to be operated with two hands and are easy to get hot hands when ironing.

In order to operate the ironing machine/hanging ironing machine more conveniently, those skilled in the field began to attach an adsorption function to the ironing machine, for example, a Chinese patent "a steam brush" with the patent application number NO. CN202122860516.1, which discloses that "when the steam brush is used to iron clothes, the air blowing and sucking device sucks air, and outside air enters from the first air port, so that negative pressure is formed at the first air port and clothes are adsorbed. The clothe are kept as flat as possible on that premise that a user doe not need to flatten the clothes by hand when ironing, and meanwhile, the heat element assembly heats the water from the water tank assembly into steam to be sprayed from the steam outlet, so that the ironing function of the steam brush is realized, and the user can iron the clothes by holding the steam brush with one hand by adopting the working mode of combining adsorption and ironing, so that the operation is simple and the use is convenient".

However, this scheme uses axial flow fan, because the working voltage of the fan and the working voltage of the heating element assembly are not in the same voltage range, it is necessary to assemble an additional motherboard to drive the fan, so the cost is relatively high. In view of this, how to reduce the production cost of ironing machine under the premise of realizing the adsorption function has become a technical problem that needs to be solved urgently by those skilled in this field.

The above information is given as background information only to assist in understanding the disclosure, and it does not determine or admit whether any of the above information can be used as prior art relative to the disclosure.

SUMMARY

The purpose of the disclosure is to provide an ironing machine to solve or at least partially solve the technical problems existing in the prior art.

In order to achieve this goal, the disclosure adopts the following technical scheme:

In a first aspect, the disclosure provides an ironing machine, which includes an ironing part, where the ironing part includes a heating cabin body and a dust collecting box being isolated;

where a heating element assembly is arranged in the heating cabin body, and the heating element assembly includes a heating main body for generating steam, where the heating main body is provided with a main heat pipe and an auxiliary heat pipe connected in parallel, and the auxiliary heat pipe is connected in series with a fan; a surface of the heating cabin body is provided with a plurality of air injection ports, and steam generated by the heating main body is ejected through the air injection ports;

an air port of the fan is communicated with an inside of the dust collecting box, a surface of the dust collecting box is provided with a plurality of adsorption holes communicated with the inside of the dust collecting box, and when the fan works, negative pressure is generated in the dust collecting box by pumping air in the dust collecting box.

Optionally, the heating element assembly further includes a heating element upper cover and a heating element lower cover;

the heating element upper cover and the heating main body are enclosed to form an upper cabin body, and the heating element lower cover and the heating main body are enclosed to form a lower cabin body; the upper cabin body and the lower cabin body are two independent cabin bodies; the upper cabin body and the lower cabin body are communicated through a communication opening;

the heating element upper cover is provided with a water injection port, and a water injection tank is formed at a position of the upper cabin body corresponding to the water injection port; a plurality of first guide flow plates are arranged in the upper cabin body to form an upper flow channel, and the upper flow channel is capable of guiding steam in the upper cabin body to the communication opening;

a steam port is arranged on one side, facing the air injection ports, of the heating main body; a plurality of second guide flow plates are arranged in the lower cabin body to form a lower flow channel, and the lower flow channel is capable of guiding steam in the lower cabin body to the steam port.

Optionally, a bottom of the water injection tank is provided with a plurality of conical protrusions for blasting water injected into the water injection tank into a plurality of small water droplets;

the upper flow channel is arranged as a bidirectional flow channel, and includes a first flow channel and a second flow channel symmetrically arranged on opposite sides of the water injection tank, and the steam in the upper cabin body is capable of flowing from the first flow channel or the second flow channel to the communication opening respectively;

the lower flow channel is arranged as a unidirectional flow channel, and water vapor flows to a channel outlet through the unidirectional flow channel, and then is discharged out of the heating element assembly through the steam port and sprayed out through the air injection ports.

Optionally, the main heat pipe and the auxiliary heat pipe are both U-shaped;

one end of the heating main body is provided with a first installation groove for installing the main heat pipe and a second installation groove for installing the auxiliary heat pipe, where the first installation groove and the second installation groove are both U-shaped grooves; the auxiliary heat pipe is arranged around an outside of the main heat pipe, and both ends of the auxiliary heat pipe and both ends of the main heat pipe extend out of one end of the heating main body.

Optionally, the ironing machine further includes a water storage tank, where the water storage tank is communicated with a water inlet port of a water pump, and a water outlet port of the water pump is connected to the water injection port through a pipeline;

the heating element assembly further includes a temperature controller for controlling working temperature of the heating main body, and the temperature controller is electrically connected with the main heat pipe and the auxiliary heat pipe respectively; the upper cabin body is also provided with a temperature control tank for installing the temperature controller;

Optionally, the fan is a brush fan;

the temperature controller includes a first temperature control switch KSD1 and a second temperature control switch KSD2;

the heating element assembly further includes a fuse, a first end of the fuse is used for electrically connecting a positive pole of a power supply, and a second end of the fuse is respectively electrically connected with a first end of the main heat pipe and a first end of the auxiliary heat pipe, and the first end of the main heat pipe is electrically connected with a first end of the first temperature control switch KSD1, a second end of the first temperature control switch KSD1 is electrically connected with a negative pole of the power supply, and a second end of the auxiliary heat pipe is electrically connected with a first end of the second temperature control switch KSD2;

a second end of the second temperature control switch KSD2 is electrically connected to a positive terminal of the fan, and a negative terminal of the fan is electrically connected to a positive pole of a diode D1, and a negative pole of the diode D1 is electrically connected to the negative pole of the power supply.

Optionally, a second end of the second temperature control switch KSD2 is also electrically connected with a positive input end of a voltage stabilizing chip U1, and a negative input end of the voltage stabilizing chip U1 is electrically connected with the positive pole of the diode D1;

an output end of the voltage stabilizing chip U1 is electrically connected with a power interface of a micro-control unit U2, and the micro-control unit U2 is respectively electrically connected with an LED lamp for distinguishing working state of the ironing machine, a screen for displaying working state information of the ironing machine, an air quality sensor for detecting cleaning state of clothes by detecting air quality, and an ultraviolet lamp for disinfection and sterilization.

Optionally, the fan is a brush fan;

the temperature controller includes a first temperature control switch KSD1 and a second temperature control switch KSD2;

the heating element assembly further includes a fuse, a first end of the fuse is used for electrically connecting a positive pole of a power supply, and a second end of the fuse is respectively electrically connected with a first end of the main heat pipe and a first end of the auxiliary heat pipe, a first end of the main heat pipe is electrically connected with a first end of the first temperature control switch KSD1, and a second end of the first temperature control switch KSD1 is used for electrically connecting a negative pole of the power supply, and a second end of the auxiliary heat pipe is electrically connected with a first end of the second temperature control switch KSD2;

a second end of the second temperature control switch KSD2 is electrically connected with a positive pole of a diode D3 and a negative pole of a diode D5, a negative pole of the diode D3 is electrically connected with a positive terminal of the fan and a negative pole of a diode D4, a positive pole of the diode D5 is electrically connected with a negative terminal of the fan and a positive pole of a diode D6, and a negative pole of the diode D6 is electrically connected with a positive pole of the diode D4 and a second end of the first temperature control switch KSD1.

Optionally, the fan is a brushless fan;

the temperature controller includes a first temperature control switch KSD1 and a second temperature control switch KSD2;

the heating element assembly further includes a fuse, a first end of the fuse is used for electrically connecting a positive pole of a power supply, and a second end of the fuse is electrically connected with a first end of the main heat pipe and a first end of the auxiliary heat pipe, and the first end of the main heat pipe is electrically connected with a first end of the first temperature control switch KSD1, and a second end of the first temperature control switch KSD1 is electrically connected with a positive pole of the power supply;

a second end of the auxiliary heat pipe is electrically connected with a first end of the second temperature control switch KSD2, and a second end of the second temperature control switch KSD2 is electrically connected with a voltage stabilizing chip U3;

the second end of the second temperature control switch KSD1 is also electrically connected with a positive input end of the voltage stabilizing chip U3, and a negative input end of the voltage stabilizing chip U3 is electrically connected with a positive pole of a diode D1; an output end of the voltage stabilizing chip U3 is electrically connected with a power interface of a brushless motor driving chip CN3, and three-phase output ends of the brushless motor driving chip CN3 are respectively electrically connected with corresponding three-phase terminals on the fan.

In a second aspect, the disclosure also provides an ironing machine, which includes an ironing part, where the ironing part includes a heating cabin body and a dust collecting box being isolated.

a heating element assembly is arranged in the heating cabin body, and the heating element assembly includes a heating main body for generating steam, where a heating tube is arranged on the heating main body, and the heating tube is connected in parallel with a voltage dividing resistor, and the voltage dividing resistor is connected in series with a fan; a surface of the heating cabin body is provided with a plurality of air injection ports, and steam generated by the heating main body is ejected through the air injection ports;

an air port of the fan is communicated with an inside of the dust collecting box, a surface of the dust collecting box is provided with a plurality of adsorption holes communicated with the inside of the dust collecting box, and when the fan works, negative pressure is generated in the dust collecting box by pumping air in the dust collecting box.

Compared with the prior art, the disclosure has the following beneficial effects.

The disclosure adopts the form of double heat pipes, and the two heat pipes work at the same time, one main heat pipe generates heat to produce steam, the other auxiliary heat pipe is used to assist heating and partial pressure, and a low-voltage load can be connected behind the auxiliary heat pipe, so there is no need to install an additional driving board to supply power to the fan, which not only improves the heating efficiency, but also greatly reduces the cost. In addition, through the adsorption function of the fan, the disclosure realizes the combination of adsorption and ironing, so that the user can iron clothes only by operating with one hand and holding, which is very convenient.

The disclosure has other characteristics and advantages, which will be obvious from the drawings and the following detailed embodiments being incorporated herein, or will be set forth in detail in the drawings and the detailed embodiments being incorporated herein, and the drawings and the detailed embodiments together serve to explain the specific principles of the disclosure.

BRIEF DESCRIPTION OF THE DRAWINGS

In order to more clearly explain the embodiments of the disclosure or the technical scheme in the prior art, the drawings needed to be used in the description of the embodiments or the prior art will be briefly introduced below. Obviously, the drawings in the following description are only some embodiments of the disclosure, and other drawings can be obtained according to these drawings without creative work for ordinary skilled in the field.

Figure 1:
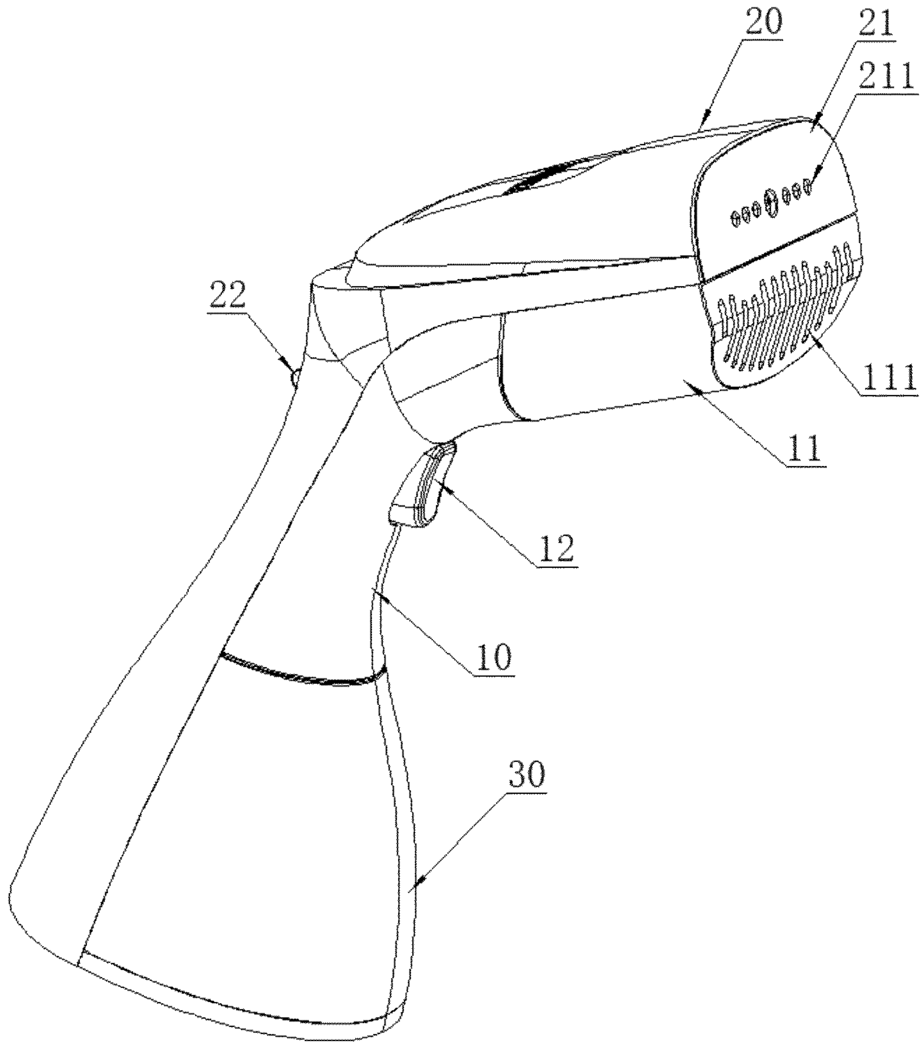
FIG. 1 is a schematic diagram of the overall structure of an ironing machine provided by the embodiment of the disclosure.

List of reference characters: 10 front shell; 11 dust collecting box; 111 adsorption hole; 12 trigger; 121 micro switch; 13 water tank button; 14 key holder; 20 back shell; 21 ironing panel; 211 air injection port; 22 fan switch; 221 gear switch; 222 switch cover; 30 water storage tank; 40 heating element assembly; 41 main heat pipe; 42 auxiliary heat pipe; 43 temperature controller; 44 heating main body; 440 temperature control tank; 441 first installation groove; 442 second installation groove; 443 first guide flow plate; 444 water injection tank; 4441 protrusion; 445 communication opening; 446 installation column; 447 second guide flow plate; 448 unidirectional channel; 4481 channel outlet; 449 steam port; 45 heating element upper cover; 451 water injection port; 46 heating element lower cover; 47 fuse; 50 fan; 60 water pump; 70 screen; 80 air quality sensing module; and 90 ultraviolet lamp.

DETAILED DESCRIPTION OF THE EMBOIMENTS

In order to explain in detail the possible application scenarios, technical principles, specific plans that can be implemented, and the goals and effects can be achieved, the following is a detailed description in combination with the listed specific embodiments and the accompanying drawings. The embodiments described here are only used to more clearly explain the technical scheme of the disclosure, so they are only used as examples, and cannot be used to limit the protection scope of the disclosure.

Reference to "an embodiment" herein means that a particular feature, structure or characteristic described in connection with an embodiment can be included in at least one embodiment of the disclosure. The appearance of the word "embodiment" in various positions in the description does not necessarily refer to the same embodiment, nor does it particularly limit its independence or correlation with other embodiments. In principle, in this disclosure, as long as there is no technical contradiction or conflict, all the technical features mentioned in each embodiment can be combined in any way to form a corresponding implementable technical solution.

Unless otherwise defined, the technical terms used herein have the same meanings as commonly understood by those skilled in the technical field to which this disclosure belongs. The use of related terms herein is only for describing specific embodiments, and is not intended to limit the disclosure.

In the description of this disclosure, the term "and/or" is an expression used to describe the logical relationship between objects, indicating that there can be three kinds of relationships, such as A and/or B, indicating that there are three situations: A, B, and A and B at the same time. In addition, the character "/" herein generally indicates that the context object is a logical relationship of "or".

In this disclosure, terms such as "first" and "second" are only used to distinguish one entity or operation from another entity or operation, and do not necessarily require or imply that there is any actual relationship between these entities or operations, such as quantity, priority or order.

Without further restrictions, in this disclosure, the words "including", "containing", "having" or other similar expressions used in the sentence are intended to cover non-exclusive inclusion, and these expressions do not exclude that there may be other elements in the process, method or product including the elements, so that the process, method or product including a series of elements can include not only those limited elements, but also other elements not explicitly listed, or include elements inherent to such a process, method or product.

In the description of the embodiment of this disclosure, the expressions related to space are used, such as "center", "longitudinal", "lateral", "length", "width", "thickness", "up", "down", "front", "back", "left", "right", "vertical", "horizontal", "perpendicular", "top", "bottom", "inside", "outside", "clockwise", "counterclockwise", "axial", "radial" and "circumferential". The indicated orientation or positional relationship is based on the specific embodiment or the orientation or positional relationship shown in the drawings, and is only for the convenience of describing the specific embodiment of the disclosure or for readers' understanding. It does not indicate or imply that the indicated device or component must have a specific position, a specific orientation, or be constructed or operated in a specific orientation, so it cannot be understood as a limitation of the embodiment of the disclosure.

Unless otherwise specified or limited, in the description of the embodiment of this disclosure, the terms such as "installation", "connecting" "connection", "fixing" and "setting" used should be broadly understood. For example, the "connection" can be a fixed connection, can also be a detachable connection, or an integrated arrangement. It can be a mechanical connection, can also be an electrical connection or a communication connection. They can be directly connected or indirectly connected through an intermediary. It can be the communication inside two elements or the interaction between two elements. For those skilled in the technical field to which this disclosure belongs, the specific meanings of the above terms in the embodiment of this disclosure can be understood according to specific conditions.

Embodiment 1

Figure 2:
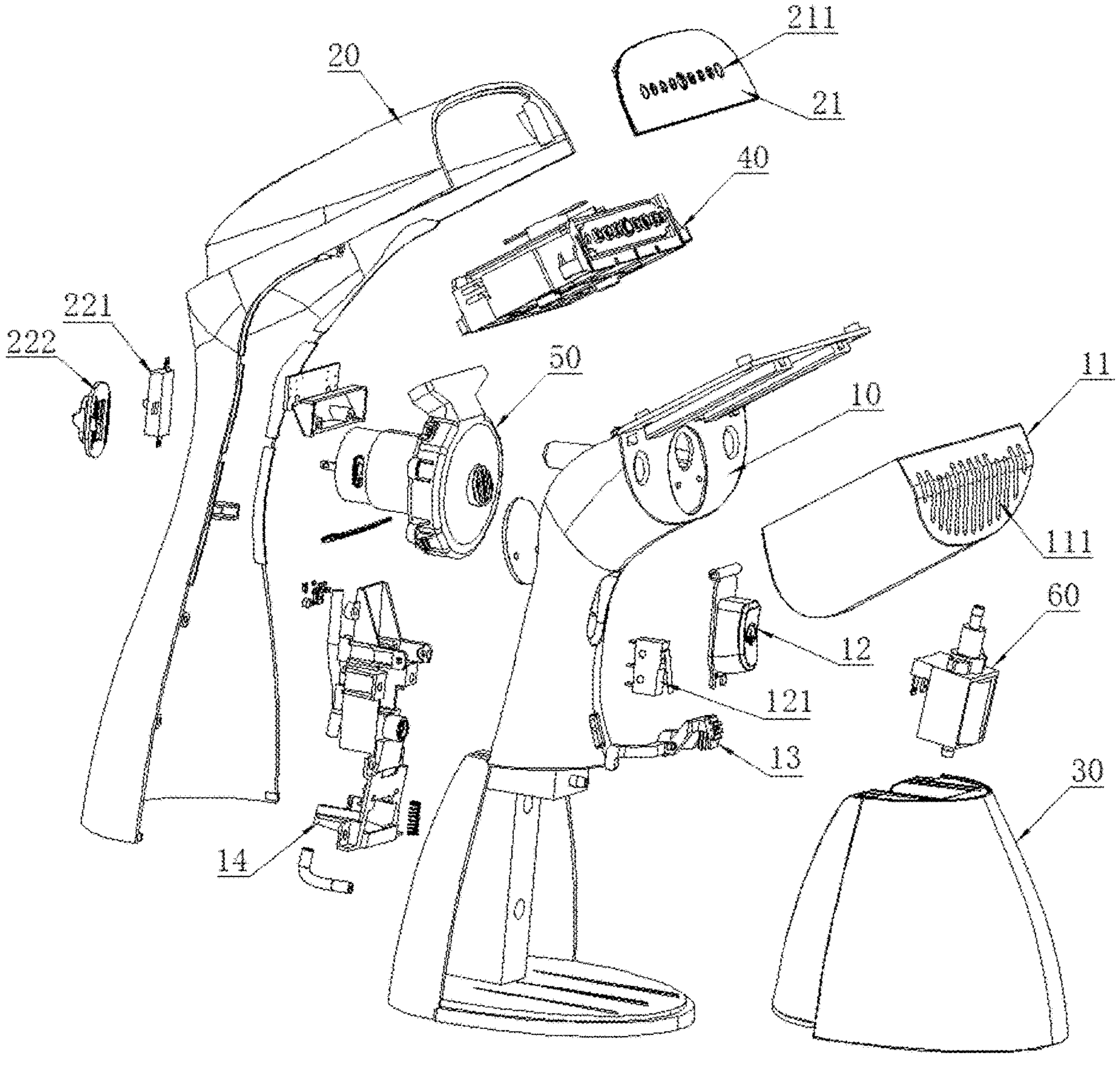
FIG. 2 is an explosion structural diagram of an ironing machine provided by the embodiment of the disclosure.
Figure 3:
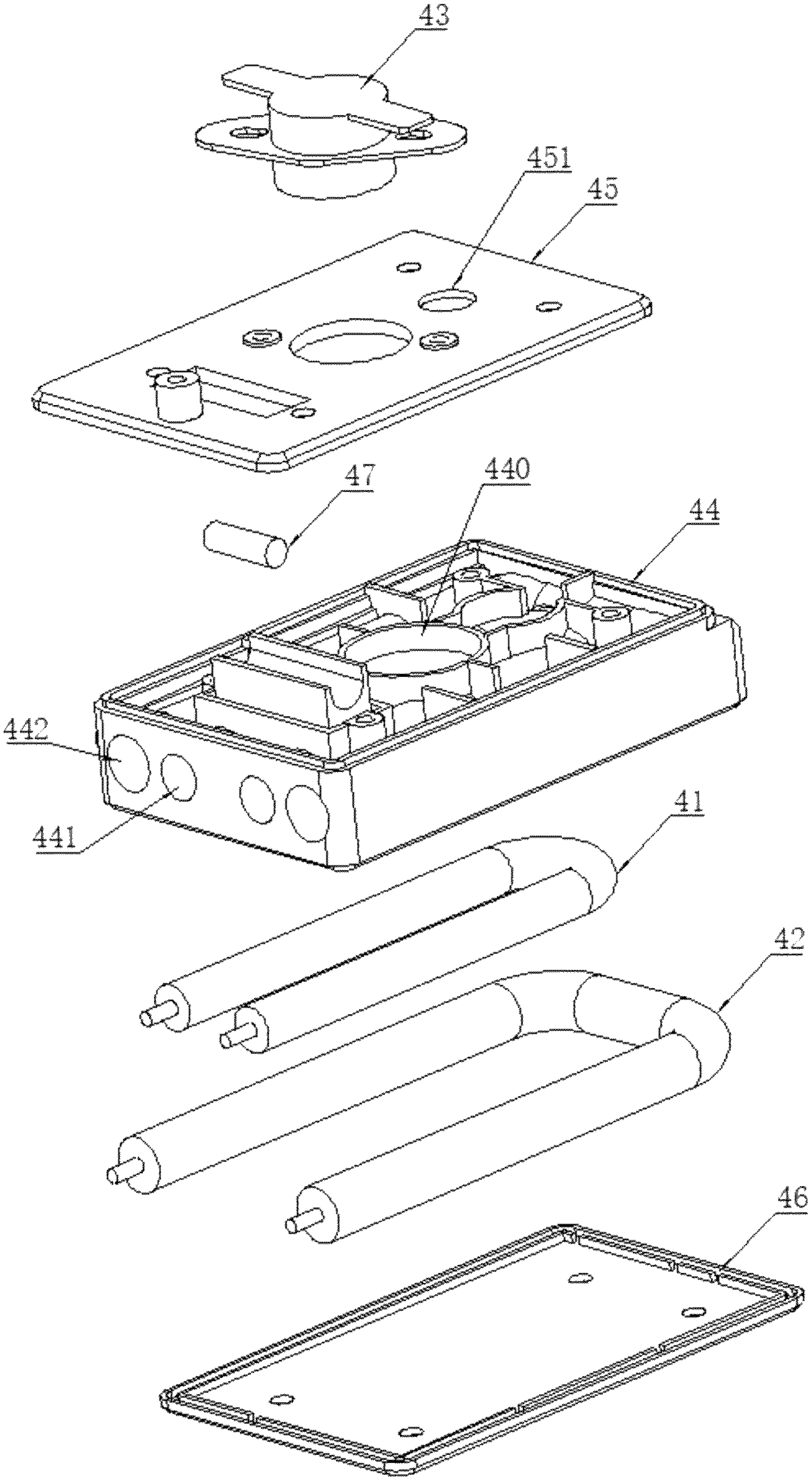
FIG. 3 is an explosion structural diagram of a heating element assembly provided by the embodiment of the disclosure.

Please refer to FIGS. 1-3, FIG. 1 is a schematic diagram of the overall structure of an ironing machine provided by the embodiment of the disclosure; FIG. 2 is an explosion structural diagram of an ironing machine provided by the embodiment of the disclosure;

FIG. 3 is an explosion structural diagram of a heating element assembly provided by the embodiment of the disclosure.

As shown in FIG. 1, the ironing machine includes an ironing part, where the ironing part includes a heating cabin body and a dust collecting box 11 being isolated. The surface of the heating cabin body is provided with a plurality of air injection ports 211, and the surface of the dust collecting box 11 is provided with a plurality of adsorption holes 111 communicating with the inside of the dust collecting box 11.

Please refer to FIG. 1 and FIG. 2, after the front shell 10 and the back shell 20 of the ironing machine are fastened, an installation cavity can be formed around them, and the fan 50 is placed in the installation cavity. The air port of the fan 50 is communicated with the dust collecting box 11, and when the fan 50 works, negative pressure is generated in the dust collecting box 11 by pumping air in the dust collecting box 11.

A heating element assembly 40 is arranged in the heating cabin body. As shown in FIG. 3, the heating element assembly 40 includes a heating main body 44 for generating steam, and the heating main body 44 is provided with a main heat pipe 41 and an auxiliary heat pipe 42. The steam generated by the heating main body 44 is ejected through the air injection ports 211.

Figure 6:
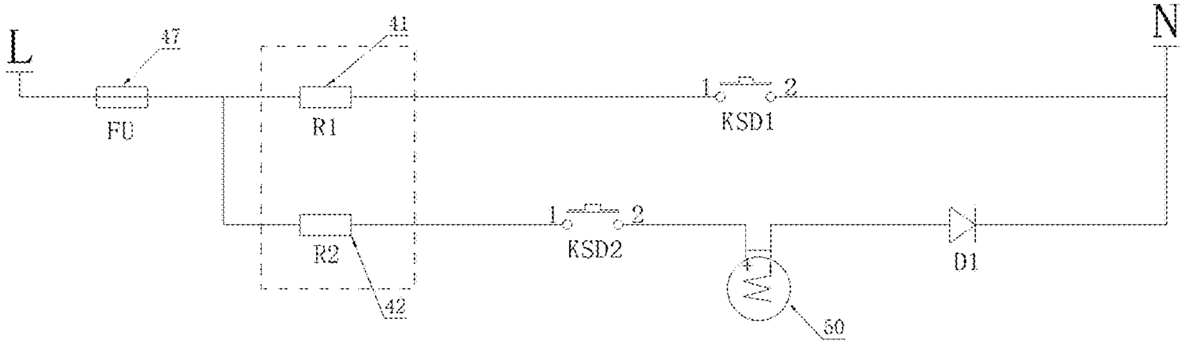
FIG. 6 is a partial circuit diagram of a control circuit of the ironing machine provided by the embodiment of the disclosure.

Further, as shown in FIG. 6, FIG. 6 is a partial circuit diagram of a control circuit of the ironing machine provided by an embodiment of the disclosure.

The main heat pipe 41 and the auxiliary heat pipe 42 are connected in parallel, and the auxiliary heat pipe 42 is connected in series with the fan 50. In FIG. 6, the resistor R1 is the main heat pipe 41, and the resistor R2 is the auxiliary heat pipe 42.

The ironing machine proposed in this embodiment adopts the form of double heat pipes, and the two heat pipes work at the same time, where the main heat pipe 41 generates heat to produce steam, and the auxiliary heat pipe 42 is used to assist heating and partial pressure, so a low-pressure load can be connected behind the auxiliary heat pipe 42. In this embodiment, there is no need to install an additional driving plate to supply power to the fan, which not only improves the heating efficiency, but also greatly reduces the cost. In addition, through the adsorption function of the fan 50, the combination of adsorption and ironing is realized, so that the user can iron clothes only by operating with one hand and holding, which is very convenient.

Specifically, as shown in FIG. 3, the heating element assembly 40 further includes a heating element upper cover 45 and a heating element lower cover 46. The heating element upper cover 45 and the heating main body 44 are enclosed to form an upper cabin body (i.e. the cabin body above the heating main body 44 shown in FIG. 3), and the heating element lower cover 46 and the heating main body 44 are enclosed to form a lower cabin body (i.e. the cabin body below the heating main body 44 shown in FIG. 3, but not shown in FIG. 3). The upper cabin body and the lower cabin body are two independent cabin bodies.

Figure 4:
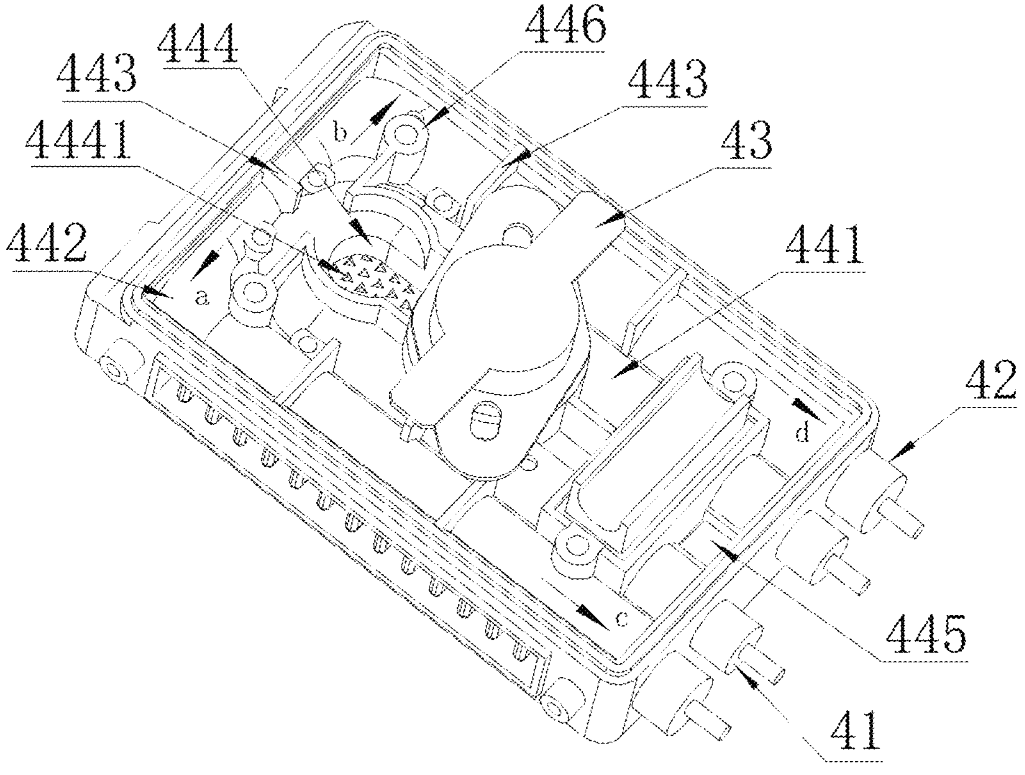
FIG. 4 is a structural schematic diagram of an upper flow channel of the heating element assembly provided by the embodiment of the disclosure.
Figure 5:
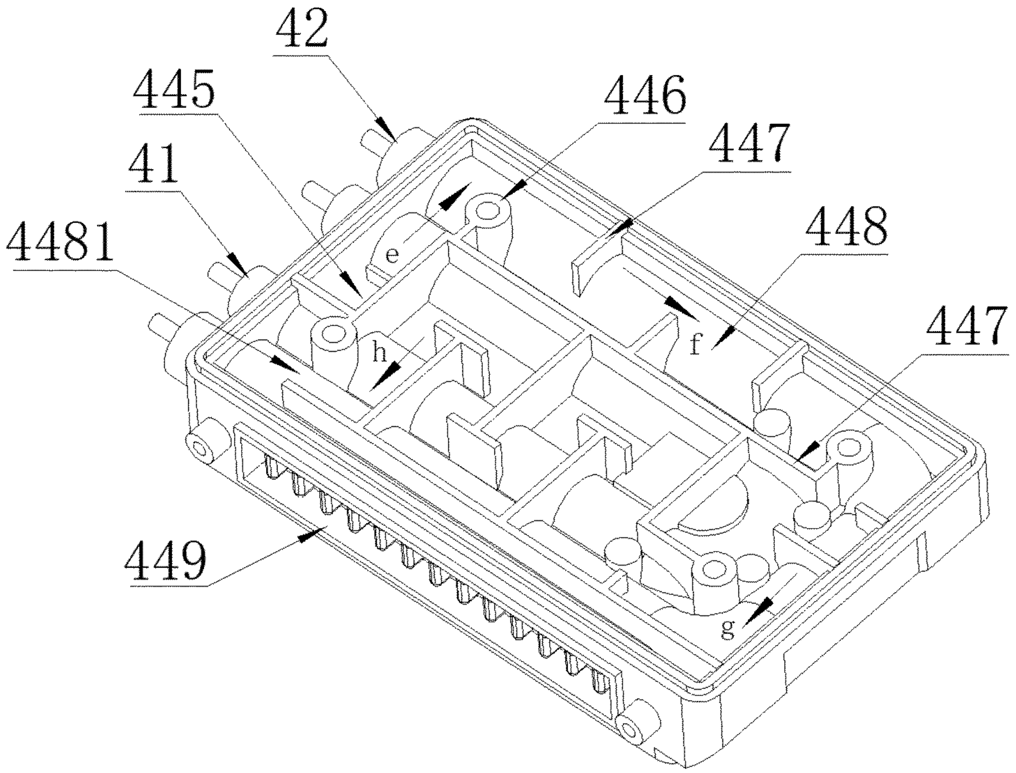
FIG. 5 is a structural schematic diagram of a lower flow channel of the heating element assembly provided by the embodiment of the disclosure.

Please continue to refer to FIGS. 4 and 5, FIG. 4 is a structural schematic diagram of an upper flow channel of the heating element assembly 40 provided by the embodiment of the disclosure; FIG. 5 is a structural schematic diagram of a lower flow channel of the heating element assembly 40 provided by the embodiment of the disclosure.

The upper cabin body and the lower cabin body communicate through the communication opening 445.

Further, as shown in FIG. 4, the heating element upper cover 45 is provided with a water injection port 451, and a water injection tank 444 is formed at a position of the upper cabin body corresponding to the water injection port 451. A plurality of first guide flow plates 443 are arranged in the upper cabin body to form an upper flow channel, the upper flow channel can guide the steam in the upper cabin body to the communication opening 445.

As shown in FIG. 5, the side, facing the air injection port 211, of the heating main body 44 is provided with a steam port 449. A plurality of second guide flow plates 447 are arranged in the lower cabin body to form a lower flow channel, the lower flow channel can guide the steam in the lower cabin body to the steam port 449. The steam port 449 communicates with the lower cabin body.

As a preferred embodiment, as shown in FIG. 4, the bottom of the water injection tank 444 is provided with a plurality of conical protrusions 4441 for blasting the water injected into the water injection tank 444 into a plurality of water droplets. The blasted water droplets are equivalent to increasing the heating area of water, which is beneficial to be evaporated into steam and can effectively improve the evaporation efficiency.

In addition, in order to further improve the thermal efficiency of the heating main body 44, in this embodiment, the upper flow channel is set as a bidirectional flow channel, including a first flow channel and a second flow channel symmetrically arranged on opposite sides of the water injection tank 444, and the steam in the upper cabin body can flow from the first flow channel or the second flow channel to the communication opening 445 respectively. Where, the one-way direction (the first flow channel) of steam is: it flows in the direction of arrow from position a, passes through position c and then reaches the water injection port 451. The other-way direction of steam (the second flow channel) is: the steam flows in the direction of the arrow from position b, passes through position d, and then reaches the water injection port 451.

In order to further ensure that the steam is fully heated, the lower flow channel is set as an unidirectional flow channel to extend the stroke length of the steam in the heating main body 44. The water vapor flows to the channel outlet 4481 through the unidirectional flow channel, and then is discharged to the outside of the heating element assembly 40 through the steam port 449, and is ejected through the air injection ports 211. For easy understanding, please refer to FIG. 5, and for the specific flow direction of steam, please refer to the direction of arrow in FIG. 5, that is, the steam flows through e-f-g-h in turn and then is discharged from the steam port 449.

More specifically, by way of example, the main heat pipe 41 and the auxiliary heat pipe 42 are both U-shaped.

One end of the heating main body 44 (i.e., an end face of the heating main body 44 in the lower right direction in FIG. 4) is provided with a first installation groove 441 for installing the main heat pipe 41 and a second installation groove 442 for installing the auxiliary heat pipe 41, both of the first installation groove 441 and the second installation groove 442 are U-shaped grooves. As shown in FIG. 4 or FIG. 5, the auxiliary heat pipe 42 is arranged around the outer side of the main heat pipe 41, which is equivalent to the fact that most areas of the whole heating main body 44 are covered by heat pipes, thus effectively improving the thermal efficiency of the heat pipes. Both ends of the auxiliary heat pipe 42 and both ends of the main heat pipe 41 extend out of one end of the heating main body 44 for electrical connection with external circuits.

Specifically, the ironing machine further includes a water storage tank 30, where the water storage tank 30 is communicated with the water inlet port of the water pump 60, and the water outlet port of the water pump 60 is connected to the water injection port 451 through a pipeline.

As shown in FIG. 3, the heating element assembly 40 further includes a temperature controller 43 for controlling the working temperature of the heating main body 44, and the temperature controller 43 is electrically connected with the main heat pipe 41 and the auxiliary heat pipe 42, respectively. There is also a temperature control tank 440 for installing the temperature controller 43 in the upper cabin body.

As an optional embodiment, the fan 50 is a brush fan. Brush fan has low cost, which can greatly reduce the cost.

Please refer to FIG. 6, for the convenience of understanding and explanation, the temperature controller 43 includes a first temperature control switch KSD1 and a second temperature control switch KSD2.

The heating element assembly 40 further includes a fuse 47, the first end of the fuse 47 is used for electrically connecting the positive pole (L end in FIG. 6) of the power supply, and the second end of the fuse 47 is respectively connected with the first end of the main heat pipe 41 and the first end of the auxiliary heat pipe 42. The first end of the main heat pipe 41 is electrically connected with the first end of the first temperature control switch KSD1, and the second end of the first temperature control switch KSD1 is used for electrically connecting the negative pole (N end in FIG. 6) of the power supply, the second end of the auxiliary heat pipe 42 is electrically connected to the first end of the second temperature control switch KSD2.

The second end of the second temperature control switch KSD2 is electrically connected to the positive terminal of the fan 50, and the negative terminal of the fan 50 is electrically connected to the positive pole of the diode D1, and the negative pole of the diode D1 is electrically connected to the negative pole of the power supply.

Figure 7:
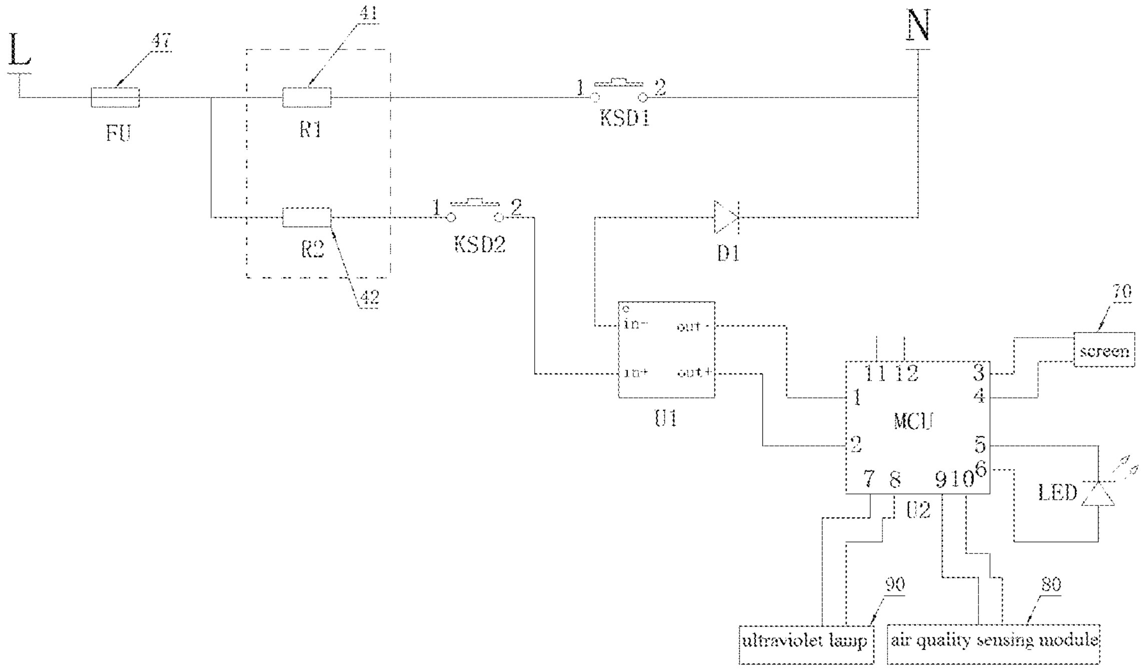
FIG. 7 is another part of the circuit diagram of a control circuit of the ironing machine provided by the embodiment of the disclosure.

Further, as a preferred embodiment, as shown in FIG. 7, FIG. 7 is another part of the circuit diagram of a control circuit of the ironing machine provided by the embodiment of the disclosure.

The second end of the second temperature control switch KSD2 is also electrically connected with the positive input end of the voltage stabilizing chip U1, and the negative input end of the voltage stabilizing chip U1 is electrically connected with the positive pole of the diode D1.

The output end of the voltage stabilizing chip U1 is electrically connected with a power interface of a micro-control unit U2, and the micro-control unit U2 is respectively electrically connected with an LED lamp for distinguishing working state of the ironing machine, a screen 70 for displaying working state information of the ironing machine, an air quality sensor 80 for detecting cleaning state of clothes by detecting air quality, and an ultraviolet lamp 90 for disinfection and sterilization.

Figure 8:
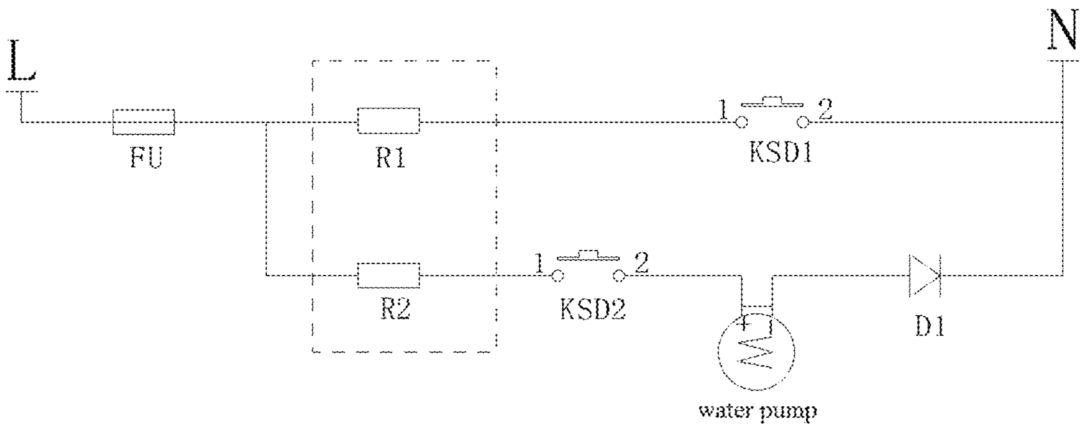
FIG. 8 is yet another part of the circuit diagram of a control circuit of the ironing machine provided by the embodiment of the disclosure.

Further, as an optional embodiment, the water pump 60 can also adopt an electromagnetic pump with a low-voltage load, as shown in FIG. 8, FIG. 8 is another part of the circuit diagram of a control circuit of the ironing machine provided by the embodiment of the disclosure.

The water pump 60 and the fan 50 are connected in parallel between the second temperature control switch KSD2 and the diode D1.

Figure 9:
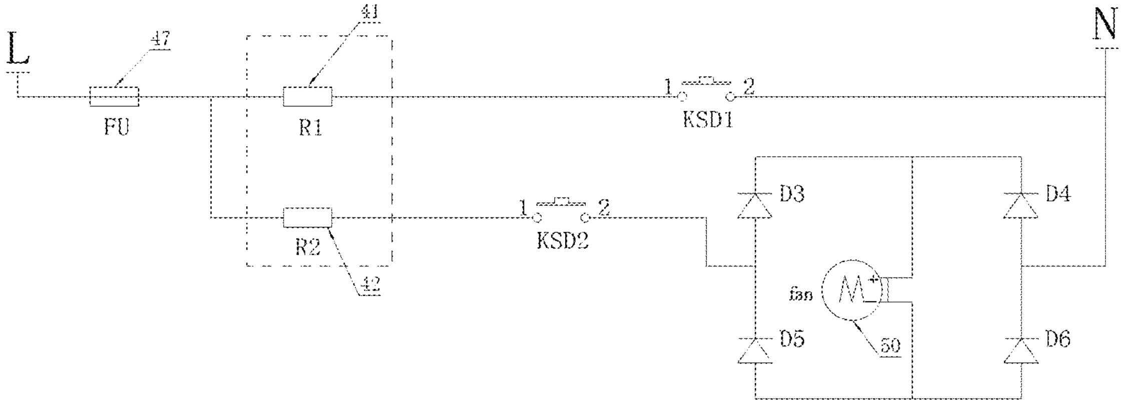
FIG. 9 is a partial circuit diagram of another control circuit of the ironing machine provided by the embodiment of the disclosure.

Please continue to refer to FIG. 9, FIG. 9 is a partial circuit diagram of another control circuit of the ironing machine provided by the embodiment of the disclosure.

As another optional embodiment, when the fan 50 adopts a brush fan, the power supply effect to the fan 50 can also be achieved through full-bridge rectification.

Specifically, the second end of the fuse 47 is respectively electrically connected with the first end of the main heat pipe 41 and the first end of the auxiliary heat pipe 42, the first end of the main heat pipe 41 is electrically connected with the first end of the first temperature control switch KSD1, the second end of the first temperature control switch KSD1 is electrically connected with the negative pole of the power supply, and the second end of the auxiliary heat pipe 42 is electrically connected with the first end of the second temperature control switch KSD2.

The second end of the second temperature control switch KSD2 is electrically connected to the positive pole of diode D3 and the negative pole of diode D5, the negative pole of diode D3 are electrically connected to the positive terminal of fan 50 and the negative pole of diode D4, respectively. The positive pole of diode D5 is electrically connected to the negative terminal of fan 50 and the positive pole of diode D6, and the negative pole of diode D6 is electrically connected to the positive pole of diode D4 and the second end of the first temperature control switch KSD1, respectively.

Figure 10:
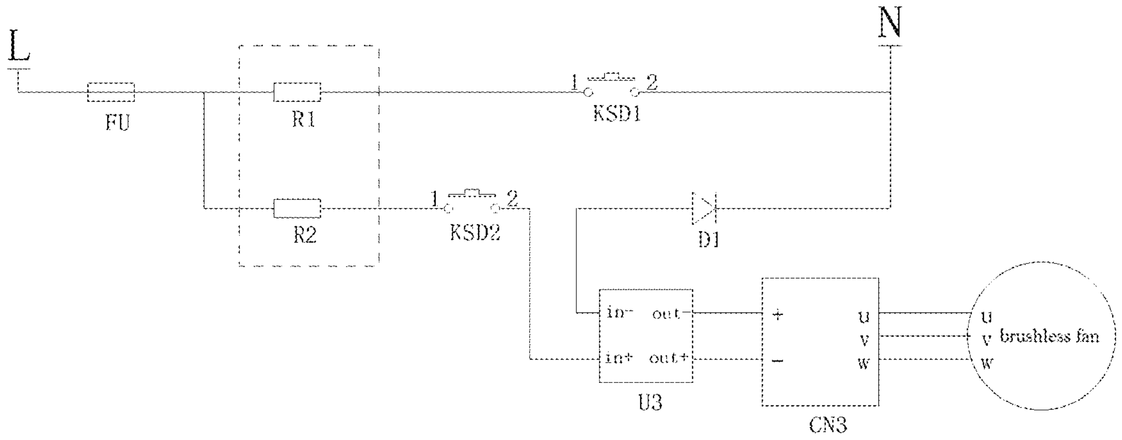
FIG. 10 is a partial circuit diagram of yet another control circuit of the ironing machine provided by the embodiment of the disclosure.

As yet another optional embodiment, when the fan 50 adopts a brushless fan, please refer to FIG. 10, FIG. 10 is a part of the circuit diagram of another control circuit of the ironing machine provided by the embodiment of the disclosure.

Specifically, the temperature controller 43 includes a first temperature control switch KSD1 and a second temperature control switch KSD2.

The first end of the fuse 47 is used for electrically connecting the positive pole of the power supply, and the second end of the fuse 47 is respectively electrically connected with the first end of the main heat pipe 41 and the first end of the auxiliary heat pipe 42, and the first end of the main heat pipe 41 is electrically connected with the first end of the first temperature control switch KSD1, and the second end of the first temperature control switch KSD1 is used for electrically connecting the negative pole of the power supply.

The second end of the auxiliary heat pipe 42 is electrically connected to the first end of the second temperature control switch KSD2, and the second end of the second temperature control switch KSD2 is electrically connected to the voltage stabilizing chip U3.

The second end of the second temperature control switch KSD1 is also electrically connected with the positive input end of the voltage stabilizing chip U3, and the negative input end of the voltage stabilizing chip U3 is electrically connected with the positive pole of the diode D1. The output end of the voltage stabilizing chip U3 is electrically connected with the power interface of the brushless motor driving chip CN3, and the three-phase output ends of the brushless motor driving chip CN3 are respectively electrically connected with the corresponding three-phase terminals on the fan 50.

It can be understood that the voltage stabilizing chip U3 and the brushless motor driving chip CN3 are both conventional components in this field, and there are many product types, so users can select materials according to different requirements or product types, so they will not be repeated here.

For easy understanding, the working principle of the ironing machine is as follows.

When the user needs to use the ironing machine for ironing operation, by pressing the trigger 12 on the front shell 10 of the ironing machine and triggering the micro switch 121, the main heat pipe 41 and the auxiliary heat pipe 42 immediately start to heat, and then by triggering the fan switch 22 (including the gear switch 221 and the switch cover 222) on the back shell 20, the operation of the fan 50 is controlled to turn on the adsorption function, as shown in FIG. 2, the above-mentioned key switches can be arranged on the key holder 14, and the detailed structure will not be described here.

When the steam generated by the heating main body 44 is sprayed uniformly from the air injection port 211, the clothes to be ironed can be targeted for ironing, and the dust collecting box 11 is in a negative pressure state when ironing, and the objects to be ironed can be adsorbed through the adsorption holes 111, so the user can operate with one hand without positioning by hand, which is very convenient; After ironing is completed, the whole ironing machine can be powered off by the trigger 12.

To sum up, the disclosure effectively reduces the production cost of the ironing machine on the premise of realizing the adsorption function.

Embodiment 2

The disclosure provides an ironing machine, which includes an ironing part, where the ironing part includes a heating cabin body and a dust collecting box 11 being isolated.

The heating element assembly 40 is arranged in the heating cabin body, and the heating element assembly 40 includes a heating main body 44 for generating steam, where a heating tube is arranged on the heating main body 44, and the heating tube is connected in parallel with a voltage dividing resistor, and the voltage dividing resistor is connected in series with a fan 50; a surface of the heating cabin body is provided with a plurality of air injection ports 211, and steam generated by the heating main body 44 is ejected through the air injection ports 211;

The air port of the fan 50 is communicated with an inside of the dust collecting box 11, a surface of the dust collecting box 11 is provided with a plurality of adsorption holes 111 communicated with the inside of the dust collecting box 11, and when the fan 50 works, negative pressure is generated in the dust collecting box 11 by pumping air in the dust collecting box 11.

Figure 11:
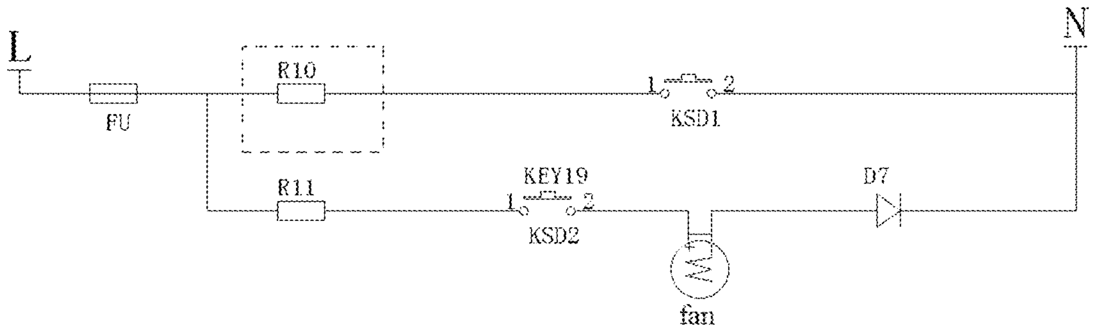
FIG. 11 is a partial circuit diagram of further control circuit of the ironing machine provided by the embodiment of the disclosure.

The specific circuit structure is shown in FIG. 11, FIG. 11 is a partial circuit diagram of further control circuit of the ironing machine provided by the embodiment of the disclosure;

The difference between this embodiment and the first embodiment is that this embodiment adopts a single heating tube heating mode, and the voltage is divided by a voltage dividing resistor R11. As for other parts of the ironing machine structure or load branch circuit, the corresponding structure or branch circuit of the first embodiment can be used. Therefore, they will not be described in detail in this embodiment.

This embodiment can be applied to use scenes that do not require high heating efficiency, and it can further reduce the production cost of the ironing machine on the premise of realizing the adsorption function.

As mentioned above, the above embodiments are only used to illustrate the technical scheme of the disclosure, but not to limit it. Although the disclosure has been described in detail with reference to the foregoing embodiments, those skilled in the art should understand that it is still possible to modify the technical scheme described in the foregoing embodiments, or to replace some technical features with equivalents. However, these modifications or substitutions do not make the essence of the corresponding technical solutions deviate from the spirit and scope of the technical solutions of various embodiments of the disclosure.

What is claimed is:

1. An ironing machine, comprising; an ironing part, wherein the ironing part comprises a heating cabin body and a dust collecting box being isolated:

wherein a heating element assembly is arranged in the heating cabin body, and the heating element assembly comprises a heating main body for generating steam, wherein the heating main body is provided with a main heat pipe and an auxiliary heat pipe connected in parallel, and the auxiliary heat pipe is connected in series with a fan; a surface of the heating cabin body is provided with a plurality of air injection ports, and steam generated by the heating main body is ejected through the air injection ports;

an air port of the fan is communicated with an inside of the dust collecting box, a surface of the dust collecting box is provided with a plurality of adsorption holes communicated with the inside of the dust collecting box, and when the fan works, negative pressure is generated in the dust collecting box by pumping air in the dust collecting box;

wherein the heating element assembly further comprises a heating element upper cover and a heating element lower cover;

the heating element upper cover and the heating main body are enclosed to form an upper cabin body, and the heating element lower cover and the heating main body are enclosed to form a lower cabin body; the upper cabin body and the lower cabin body are two independent cabin bodies; the upper cabin body and the lower cabin body are communicated through a communication opening;

the heating element upper cover is provided with a water injection port, and a water injection tank is formed at a position of the upper cabin body corresponding to the water injection port; a plurality of first guide flow plates are arranged in the upper cabin body to form an upper flow channel, and the upper flow channel is capable of guiding steam in the upper cabin body to the communication opening;

a steam port is arranged on one side, facing the air injection ports, of the heating main body; a plurality of second guide flow plates are arranged in the lower cabin body to form a lower flow channel, and the lower flow channel is capable of guiding steam in the lower cabin body to the steam port;

wherein a bottom of the water injection tank is provided with a plurality of conical protrusions for blasting water injected into the water injection tank into a plurality of small water droplets;

the upper flow channel is arranged as a bidirectional flow channel, and comprises a first flow channel and a second flow channel symmetrically arranged on opposite sides of the water injection tank, and the steam in the upper cabin body is capable of flowing from the first flow channel or the second flow channel to the communication opening respectively;

the lower flow channel is arranged as a unidirectional flow channel, and water vapor flows to a channel outlet through the unidirectional flow channel, and then is discharged out of the heating element assembly through the steam port and sprayed out through the air injection ports.

2. The ironing machine according to claim 1, wherein the main heat pipe and the auxiliary heat pipe are both U-shaped;

one end of the heating main body is provided with a first installation groove for installing the main heat pipe and a second installation groove for installing the auxiliary heat pipe, wherein the first installation groove and the second installation groove are both U-shaped grooves; the auxiliary heat pipe is arranged around an outside of the main heat pipe, and both ends of the auxiliary heat pipe and both ends of the main heat pipe extend out of one end of the heating main body.

3. The ironing machine according to claim 1, further comprising a water storage tank, wherein the water storage tank is communicated with a water inlet port of a water pump, and a water outlet port of the water pump is connected to the water injection port through a pipeline;

the heating element assembly further comprises a temperature controller for controlling working temperature of the heating main body, and the temperature controller is electrically connected with the main heat pipe and the auxiliary heat pipe respectively; the upper cabin body is also provided with a temperature control tank for installing the temperature controller.

4. The ironing machine according to claim 3, wherein the fan is a brush fan;

the temperature controller comprises a first temperature control switch KSD1 and a second temperature control switch KSD2;

the heating element assembly further comprises a fuse, a first end of the fuse is used for electrically connecting a positive pole of a power supply, and a second end of the fuse is respectively electrically connected with a first end of the main heat pipe and a first end of the auxiliary heat pipe, and the first end of the main heat pipe is electrically connected with a first end of the first temperature control switch KSD1, a second end of the first temperature control switch KSD1 is electrically connected with a negative pole of the power supply, and a second end of the auxiliary heat pipe is electrically connected with a first end of the second temperature control switch KSD2;

a second end of the second temperature control switch KSD2 is electrically connected to a positive terminal of the fan, and a negative terminal of the fan is electrically connected to a positive pole of a diode D1, and a negative pole of the diode D1 is electrically connected to the negative pole of the power supply.

5. The ironing machine according to claim 4, wherein a second end of the second temperature control switch KSD2 is also electrically connected with a positive input end of a voltage stabilizing chip U1, and a negative input end of the voltage stabilizing chip U1 is electrically connected with the positive pole of the diode D1;

an output end of the voltage stabilizing chip U1 is electrically connected with a power interface of a micro-control unit U2, and the micro-control unit U2 is respectively electrically connected with an LED lamp for distinguishing working state of the ironing machine, a screen for displaying working state information of the ironing machine, an air quality sensor for detecting cleaning state of clothes by detecting air quality, and an ultraviolet lamp for disinfection and sterilization.

6. The ironing machine according to claim 3, wherein the fan is a brush fan;

the temperature controller comprises a first temperature control switch KSD1 and a second temperature control switch KSD2;

the heating element assembly further comprises a fuse, a first end of the fuse is used for electrically connecting a positive pole of a power supply, and a second end of the fuse is respectively electrically connected with a first end of the main heat pipe and a first end of the auxiliary heat pipe, a first end of the main heat pipe is electrically connected with a first end of the first temperature control switch KSD1, and a second end of the first temperature control switch KSD1 is used for electrically connecting a negative pole of the power supply, and a second end of the auxiliary heat pipe is electrically connected with a first end of the second temperature control switch KSD2;

a second end of the second temperature control switch KSD2 is electrically connected with a positive pole of a diode D3 and a negative pole of a diode D5, a negative pole of the diode D3 is electrically connected with a positive terminal of the fan and a negative pole of a diode D4, a positive pole of the diode D5 is electrically connected with a negative terminal of the fan and a positive pole of a diode D6, and a negative pole of the diode D6 is electrically connected with a positive pole of the diode D4 and a second end of the first temperature control switch KSD1.

7. The ironing machine according to claim 3, wherein the fan is a brushless fan;

the temperature controller comprises a first temperature control switch KSD1 and a second temperature control switch KSD2;

the heating element assembly further comprises a fuse, a first end of the fuse is used for electrically connecting a positive pole of a power supply, and a second end of the fuse is electrically connected with a first end of the main heat pipe and a first end of the auxiliary heat pipe, and the first end of the main heat pipe is electrically connected with a first end of the first temperature control switch KSD1, and a second end of the first temperature control switch KSD1 is electrically connected with a positive pole of the power supply;

a second end of the auxiliary heat pipe is electrically connected with a first end of the second temperature control switch KSD2, and a second end of the second temperature control switch KSD2 is electrically connected with a voltage stabilizing chip U3;

the second end of the second temperature control switch KSD1 is also electrically connected with a positive input end of the voltage stabilizing chip U3, and a negative input end of the voltage stabilizing chip U3 is electrically connected with a positive pole of a diode D1; an output end of the voltage stabilizing chip U3 is electrically connected with a power interface of a brushless motor driving chip CN3, and three-phase output ends of the brushless motor driving chip CN3 are respectively electrically connected with corresponding three-phase terminals on the fan.

8. An ironing machine, comprising an ironing part, wherein the ironing part comprises a heating cabin body and a dust collecting box being isolated;

a heating element assembly is arranged in the heating cabin body, and the heating element assembly comprises a heating main body for generating steam, wherein a heating tube is arranged on the heating main body, and the heating tube is connected in parallel with a voltage dividing resistor, and the voltage dividing resistor is connected in series with a fan; a surface of the heating cabin body is provided with a plurality of air injection ports, and steam generated by the heating main body is ejected through the air injection ports;

an air port of the fan is communicated with an inside of the dust collecting box, a surface of the dust collecting box is provided with a plurality of adsorption holes communicated with the inside of the dust collecting box, and when the fan works, negative pressure is generated in the dust collecting box by pumping air in the dust collecting box.

* * * * *